United States Patent
Edmisten

(10) Patent No.: US 10,533,295 B2
(45) Date of Patent: Jan. 14, 2020

(54) NETTING CONDUIT

(71) Applicant: John Edmisten, Neah Bay, WA (US)

(72) Inventor: John Edmisten, Neah Bay, WA (US)

(*) Notice: Subject to any disclaimer, the term of this patent is extended or adjusted under 35 U.S.C. 154(b) by 67 days.

(21) Appl. No.: 15/254,753

(22) Filed: Sep. 1, 2016

(65) Prior Publication Data
US 2017/0055503 A1 Mar. 2, 2017

Related U.S. Application Data

(60) Provisional application No. 62/212,726, filed on Sep. 1, 2015.

(51) Int. Cl.
*E02B 1/00* (2006.01)
*A01K 61/95* (2017.01)
*A01K 75/00* (2006.01)

(52) U.S. Cl.
CPC ............. *E02B 1/006* (2013.01); *A01K 61/95* (2017.01); *A01K 75/00* (2013.01)

(58) Field of Classification Search
CPC ........ A01K 61/90; A01K 61/95; A01K 75/00; E02B 1/006; E02B 8/08; E02B 8/085
USPC .................................................. 119/216, 219
See application file for complete search history.

(56) References Cited

U.S. PATENT DOCUMENTS

| | | | |
|---|---|---|---|
| 735,545 A | 8/1903 | Mayhew | |
| 1,393,907 A | 10/1921 | Reimer | |
| 1,585,483 A * | 5/1926 | Freer | A01K 69/06 43/14 |
| 2,137,663 A | 11/1938 | Aspenburg | |
| 2,643,481 A * | 6/1953 | Ederer | A01K 61/90 119/216 |
| 3,040,980 A | 6/1962 | Mann et al. | |
| 3,561,150 A * | 2/1971 | Silchenstedt | A01K 73/02 367/130 |
| 4,029,049 A * | 6/1977 | Hillier | A01K 69/00 119/219 |
| 4,351,127 A | 9/1982 | Mitchell | |
| 4,402,154 A * | 9/1983 | Pence | A01K 80/00 43/9.2 |
| 4,437,431 A * | 3/1984 | Koch | E02B 8/085 405/83 |
| 5,076,000 A * | 12/1991 | Anthony | A01K 75/00 43/9.2 |
| 5,123,195 A * | 6/1992 | Hawkins | A01K 61/90 43/9.2 |
| 5,816,196 A * | 10/1998 | Webster | A01K 61/90 119/228 |
| 6,223,462 B1* | 5/2001 | Johannesson | A01K 73/02 43/9.2 |
| 2004/0244712 A1* | 12/2004 | Massey | A01K 61/90 119/216 |

(Continued)

*Primary Examiner* — Lisa L Tsang
(74) *Attorney, Agent, or Firm* — Global Intellectual Property Agency, LLC; Daniel Boudwin

(57) ABSTRACT

A netting conduit. The conduit defines a continuous channel extending between a first open end and a second open end. The conduit is fabricated from netting having a mesh size sufficient to prevent most fish from traversing through the netting material. The conduit tapers from the first open end to a midsection and enlarges from the midsection to the second open end. The longitudinal edges of the conduit can define a parabolic shape. The conduit further includes stakes that are usable to anchor the conduit to the bed of the waterway in which the conduit is in use.

18 Claims, 2 Drawing Sheets

(56) References Cited

U.S. PATENT DOCUMENTS

2005/0160656 A1* 7/2005 Safwat ................ A01K 73/045
  43/9.95
2015/0034016 A1* 2/2015 Aufleger ................ A01K 29/00
  119/220

* cited by examiner

NETTING CONDUIT

CROSS REFERENCE TO RELATED APPLICATIONS

This application claims the benefit of U.S. Provisional Application No. 62/212,726 filed on Sep. 1, 2015. The above identified patent application is herein incorporated by reference in its entirety to provide continuity of disclosure.

BACKGROUND OF THE INVENTION

The present invention relates to fishing nets, devices configured to assist in the counting of fish, or fishing weirs or other such devices configured to direct the passage of fish in waterways. More specifically, the present invention relates to devices configured to be placed in waterways in order to redirect fish and thereby assist individuals in counting the fish passing through the waterway.

Fish hatchery surveyors are often tasked with the difficult chore of counting the number of fish in a river or other such waterway. Fish are generally counted at a narrow part of the river in order to reduce the number of fish that the surveyors need to count simultaneously; however, even the narrowest part of a river is generally not narrow enough to prevent a significant number of fish from swimming abreast and too quickly to be counted accurately. This results in defective counts and inaccurate figures. Therefore, there exists a need for a device that can limit the path of fish in a river to more accurately count them.

SUMMARY OF THE INVENTION

In view of the foregoing disadvantages inherent in the known types of fish counting or trapping devices now present in the prior art, the present invention provides a netting conduit wherein the same can be utilized for providing convenience for the user when counting the number of fish within a river or another such waterway. The conduit defines a continuous channel extending between a first open end and a second open end. The conduit is fabricated from netting having a mesh size sufficient to prevent most fish from traversing through the netting material. The conduit tapers from the first open end to a midsection and enlarges from the midsection to the second open end. The longitudinal edges of the conduit can define a parabolic shape. The conduit further includes stakes that are usable to anchor the conduit to the bed of the waterway in which the conduit is in use.

BRIEF DESCRIPTION OF THE DRAWINGS

Although the characteristic features of this invention be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
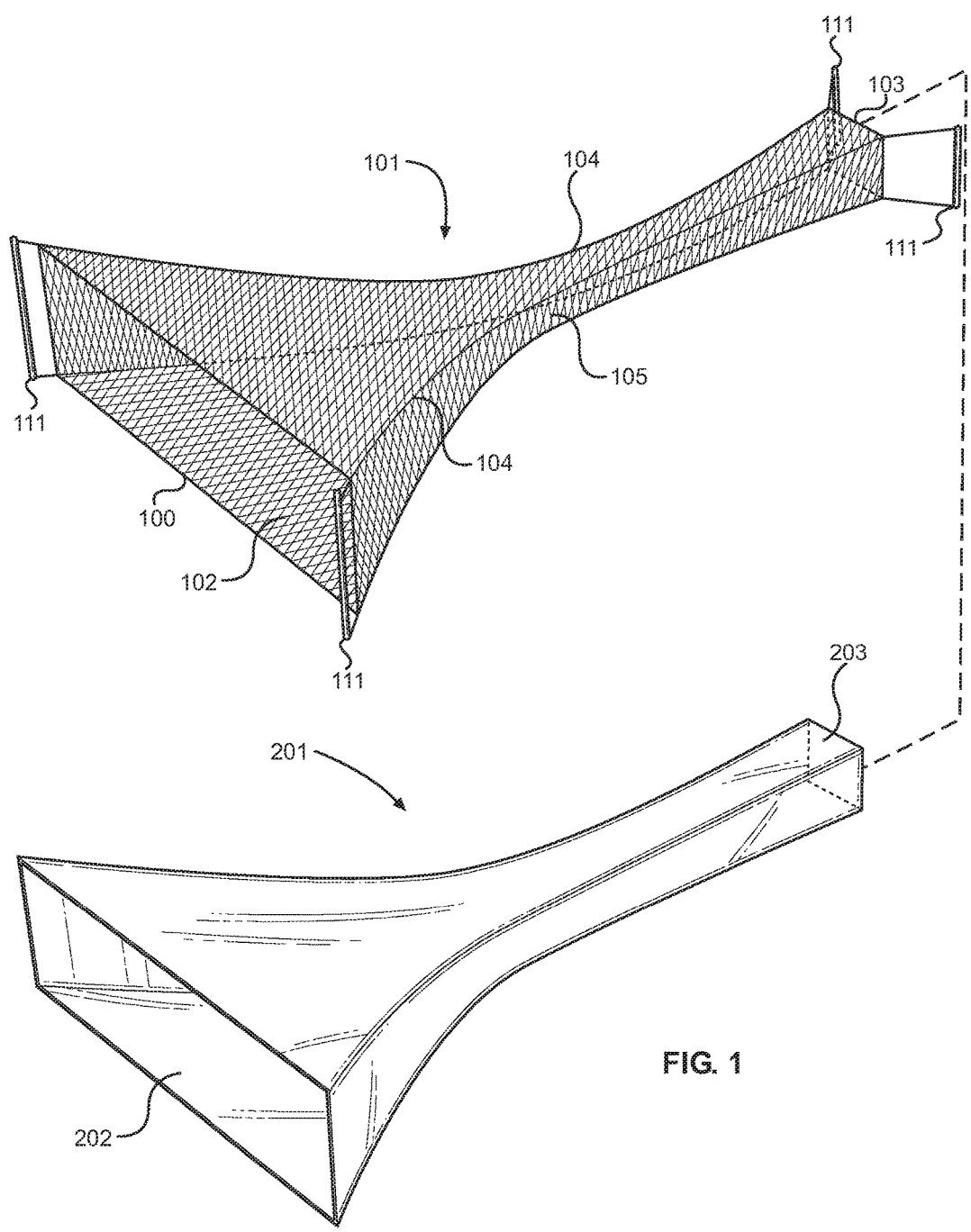
FIG. 1 shows a perspective vie of a netting conduit.

Reference is made herein to the attached drawings. Like reference numerals are used throughout the drawings to depict like or similar elements of the netting conduit. The figures are intended for representative purposes only and should not be considered to be limiting in any respect.

Referring now to FIG. 1, there is shown a perspective view of a netting conduit. The conduit 101 includes a first open end 102 and a second open end 103 with a continuous channel extending therebetween. The conduit 101 is constructed from a netting or mesh material, i.e., a material composed of fibers or threads woven together to form a grid-like structure. The netting has a mesh size configured to prevent a fish from being able to pass, without restricting the flow of water, therethrough. In one embodiment, the conduit 101 is constructed entirely from the netting material. Furthermore, the netting of the conduit 101 can be uniform in construction along the entire length thereof.

The conduit 101 includes a pair of edges 104 extending longitudinally between the first open end 102 and the second open end 103. The edges 104 taper from the first open end 102 to a midsection 105 of the conduit 101 and then enlarge from the midsection 105 to the second open end 103. In one embodiment, a width of the first open end 102 is larger than a width of the second open end 103, which is in turn larger than a width of the midsection 105. In another embodiment, a cross-sectional area of the first open end 102 is larger than a cross-sectional area of the second open end 103, which is in turn larger than a cross-sectional area of the midsection 105. In an illustrative embodiment, the edges 104 are arcuate or parabolic in shape.

The conduit 101 further includes a plurality of stakes 111 attached thereto that are configured to anchor the conduit 101 to the bed of the waterway in which the conduit 101 has been placed. In an illustrative embodiment of the conduit 101, the stakes 111 include a first set of stakes disposed at the first open end 102 and a second set of stakes disposed at the second open end 103. When both sets of stakes 111 are anchored to the bed of the waterway, the conduit 101 can be held taut therebetween.

The conduit 101 can be utilized by orienting it roughly longitudinally with respect to the direction of the flow of a waterway. Furthermore, the first open end 102 is directed towards the direction from which the user expects fish to be coming, such that fish enter the first open end 102 and are then forced to proceed linearly through the conduit 101 as it tapers towards the midsection 105. The conduit 101 can be provided in a number of different sizes in order to accommodate waterways having different dimensions and different types of fish. In one embodiment, the midsection 105 has a cross-sectional area equal to or slightly larger than the size of the fish that the user wishes to count, allowing only a single fish to pass through the midsection 105 at a time and thereby making the fish easier to count. In one embodiment, the conduit 101 can be fabricated such that the width and the depth of the first open end 102 are close to the width and the depth of the waterway, thereby ensuring that substantially all of the fish passing through the waterway likewise pass through the conduit 101 when put into place within the waterway.

An embodiment of the conduit 101 further includes a cover 201 or sleeve that is securable thereover. The cover 201 constructed from continuous sheet of material lacking any openings. The cover 201 matches the size and shape of the conduit, including a first open end 202 corresponding to the first open end 102 of the conduit 101 and a second open end 203 corresponding to the second open end 103 of the conduit 101. The cover 201 is configured to be tightly securable over the conduit 101 when the conduit 101 is taut, blocking the mesh openings of the netting of the conduit 101 when secured thereover. The cover 201 can be utilized, e.g., when counting fisher that are smaller than the mesh size of the conduit 101, as such fish would otherwise be free to move through the netting material of the conduit 101.

Figure 2:
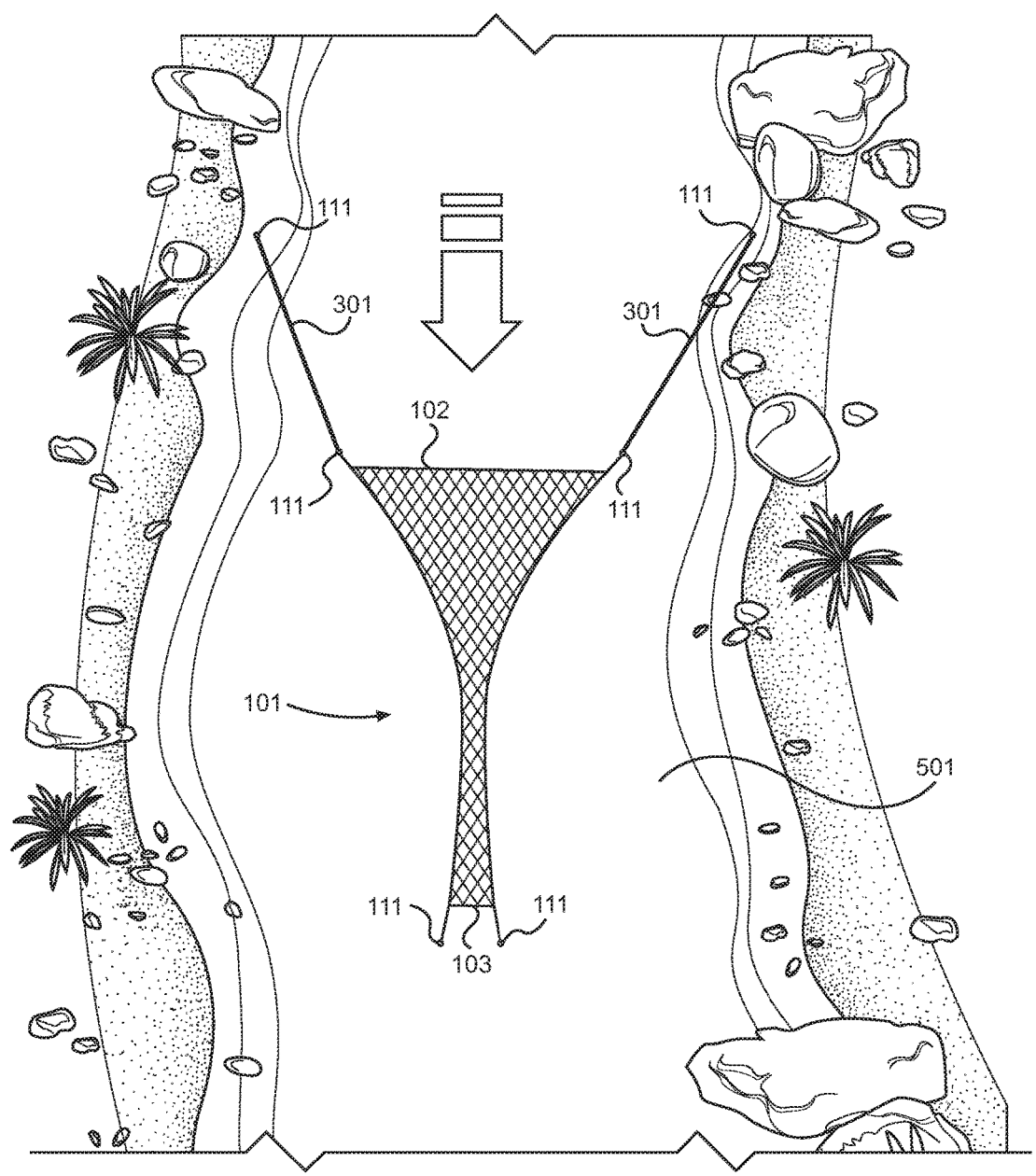
FIG. 2 shows a diagram of a netting conduit in use in a waterway.

Referring now to FIG. 2, there is shown a diagram of a netting conduit in use in a waterway. In an alternative embodiment, the conduit 101 further includes wings 301 extending from the lateral sides of the first open end 102. The wings 301 are configured to unfurl or extend from the first open end 102 to a desired length, allowing users to adjust the conduit 101 for use in waterways 501 having different widths. In one embodiment, the wings 301 are constructed from the same netting material as the conduit 101. The wings 301 further includes stakes 111 disposed at their distal ends so that the wings 301 can be secured in place when unfurled. The wings 301 can include a height greater than or equal to the depth of the waterways 501 in which the conduit 101 is intended to be used, thereby allowing the wings 301 to serve as barriers preventing fish from passing over or around the wings 301 and directing the fish towards the first open end 102. In one embodiment, the height of the wings 301 is equal to the height of the first open end 102 so that they conduit 101 and the wings 301 are congruent. In one embodiment, the wings 301 further include inflatable structures disposed along their top edges. The inflatable structures along the wings 301 maintain the wings 301 in an upright position, perpendicular relative to the surface of the waterway 501.

The wings 301 are extended in length so that they can be secured to the banks of the waterway 501 well upstream of the conduit 101 so that drag from the flow of the waterway 501 on the assembly is reduced. In one embodiment, the length of each of the wings 301 is equal to three-quarters of the length of the conduit 101. The wings 301 being three-quarters of the length of the conduit 101 has experimentally been found to balance the amount of drag on the assembly without the need for the wings 301 to be excessively long.

This embodiment of the conduit 101 is utilized within a waterway 501, e.g., a river, by orienting the first open end 102 towards the direction from which the fish the user wishes to count will be coming and then securing the conduit 101 tautly in place via the stakes 111 disposed on the body of the conduit 101. The user then unfurls the wings 301, extends the wings 301 to the edge of the waterway 501, and then secures the wings 301 in place via the stakes 111 disposed thereon. The conduit 111 thereby serves as a means for creating an artificial chokepoint in a waterway 501 for counting fish or other aquatic life passing therethrough that does not disrupt the flow of the waterway 501 and is adjustable.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for evaluation of organisms in a waterway, comprising:
   a netting conduit, consisting essentially of: a first open end, a second open end, four closed sidewalls extending continuously between the first and second open ends, and a channel having edges that extends therebetween;
   wherein a cross sectional area of the channel tapers from the first open end to a midsection of the netting conduit and enlarges from the midsection to the second open end;
   wherein the first open end and the second open end are unconditionally open.

2. The system of claim 1, wherein each of the first open end and the second open end is rectangular in shape.

3. The system of claim 1, wherein the netting conduit is constructed entirely from netting.

4. The system of claim 1, further comprising a plurality of stakes disposed on the netting conduit, wherein a first selection of stakes of the plurality of stakes is disposed at the first open end, wherein a second selection of stakes of the plurality of stakes is disposed at the second open end.

5. The system of claim 1, further comprising a first wing that extends laterally from a first side of the first open end and a second wing that extends laterally from a second side of the first open end.

6. The system of claim 5, further comprising a plurality of stakes disposed on the netting conduit, wherein a selection of stakes of the plurality of stakes is disposed on each of the first wing and the second wing.

7. The system of claim 5, wherein the first wing and the second wing are constructed from netting.

8. The system of claim 5, wherein a height of each of the first wing and the second wing is equal to a height of the first open end.

9. The system of claim 1, further comprising a cover configured to be secured over the netting conduit.

10. The system of claim 1, further comprising a cover corresponding in size and shape to the netting conduit.

11. A system for evaluation of organisms in a waterway, comprising:
    a netting conduit, consisting essentially of: a first open end, a second open end, four closed sidewalls extending continuously between the first and second open ends, and a channel having edges that extends therebetween;
    an anchor mechanism, comprising: a first wing attachable to a first side of the first open end and a second wing attachable to a second side of the first open end;
    wherein a cross sectional area of the channel tapers from the first open end to a midsection of the netting conduit and enlarges from the midsection to the second open end;
    wherein the first open end and the second open end are unconditionally open.

12. The system of claim 11, wherein the anchor mechanism further comprises a plurality of stakes, wherein the plurality of stakes is configured to anchor the system to a waterway in which the netting conduit is placed.

13. The system of claim 12, wherein a selection of stakes of the plurality of stakes is attached to each of the first wing and the second wing.

14. The system of claim 11, wherein a length of each of the first wing and the second wing is proportioned so as to reduce a drag from a flow of a liquid in a waterway in which the system is placed, wherein the length of each of the first wing and the second wing is equal to three-quarters of a length of the netting conduit.

15. A system for evaluation of organisms in a waterway, comprising:
- a netting conduit, consisting of: a first open end, a second open end, four closed sidewalls extending continuously between the first and second open ends, and a channel having edges that extends therebetween;
- an anchor mechanism, comprising: a first wing attachable to a first side of the first open end, and a second wing attachable to a second side of the first open end;
- wherein a cross sectional area of the channel tapers from the first open end to a midsection of the netting conduit and enlarges from the midsection to the second open end;
- wherein the first open end and the second open end are unconditionally open.

16. The system of claim 15, wherein the anchor mechanism further comprises a plurality of stakes, wherein the plurality of stakes is configured to anchor the system to a waterway in which the netting conduit is placed.

17. The system of claim 16, wherein a selection of stakes of the plurality of stakes is attached to each of the first wing and the second wing.

18. The system of claim 15, wherein a length of each of the first wing and the second wing is proportioned so as to reduce a drag from a flow of a liquid in a waterway in which the system is placed, wherein the length of each of the first wing and the second wing is equal to three-quarters of a length of the netting conduit.

* * * * *